US006796081B2

(12) United States Patent
Anderson et al.

(10) Patent No.: US 6,796,081 B2
(45) Date of Patent: Sep. 28, 2004

(54) ANIMAL TRAP

(75) Inventors: David L. Anderson, Lititz, PA (US);
Michael J. Gehret, Lititz, PA (US);
David W. Swift, Lititz, PA (US);
Christopher T. Rich, Lititz, PA (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 10/704,544

(22) Filed: Nov. 12, 2003

(65) Prior Publication Data

US 2004/0111953 A1 Jun. 17, 2004

Related U.S. Application Data

(62) Division of application No. 10/320,688, filed on Dec. 17, 2002, now Pat. No. 6,735,899.

(51) Int. Cl.[7] ............................................. A01M 23/02
(52) U.S. Cl. ......................................................... 43/98
(58) Field of Search ............................... 43/65, 98, 112, 43/131, 58, 60, 124

(56) References Cited

U.S. PATENT DOCUMENTS

| | | | |
|---|---|---|---|
| 3,197,916 A | | 8/1965 | Spurgeon et al. |
| 3,341,967 A | * | 9/1967 | Kelley ............................ 43/65 |
| 4,205,480 A | * | 6/1980 | Gartner ......................... 43/98 |
| 4,497,130 A | * | 2/1985 | Fitzgerald ...................... 43/98 |
| 4,541,198 A | * | 9/1985 | Sherman ...................... 43/131 |
| 4,949,500 A | * | 8/1990 | Jefferys ......................... 43/98 |
| 5,269,091 A | | 12/1993 | Johnson et al. |
| 5,369,907 A | | 12/1994 | Lee |
| 5,953,853 A | * | 9/1999 | Kim .............................. 43/98 |
| 5,979,108 A | * | 11/1999 | Adams ......................... 43/121 |

FOREIGN PATENT DOCUMENTS

FR 893 117 A 5/1944

\* cited by examiner

Primary Examiner—Charles T. Jordan
Assistant Examiner—Kimberly S. Smith
(74) Attorney, Agent, or Firm—Jacobson Holman PLLC

(57) ABSTRACT

An electric or electronic animal trap wherein the housing includes a pair of spaced electrodes or charge plates in a killing chamber intermediate the trap entrance and a source of bait. Interposed in the pathway to the electrodes is at least one diverter which discourages a target animal from reversing direction before it is electrocuted. In one embodiment, juxtaposed to the entrance are at least two diverter members angularly offset relative to each other to define a maze-like path to lead a target animal to the charge plates for electrocution while discouraging reversal of direction and protecting against direct access to the charge plates through the entrance opening by children, pets or non-target species. A diverter or barrier plate may be carried by the housing cover to extend into the space between the electrodes when the cover is closed, the lower edge of the barrier being spaced from the housing floor a limited distance to force a target animal to squeeze under the barrier as it passes to the second electrode making escape before electrocution difficult. This design may be utilized in combination with a spaced, upwardly extending diverter or barrier plate to block direct access to the pair of electrodes from the entrance opening. The effectiveness of an inclined plane trap assembly may also be enhanced by a plate carried by the cover which forces a target animal to stretch itself out before engaging the second electrode.

12 Claims, 9 Drawing Sheets

ANIMAL TRAP

This is a divisional of application Ser. No. 10/320,688 filed Dec. 17, 2002 now U.S. Pat. No. 6,735,899.

BACKGROUND OF THE INVENTION

1. Field of the Invention

This invention relates to electric or electronic animal traps, and relates more particularly to an animal trap adapted to catch and electrocute a targeted animal simultaneously stepping on a pair of spaced electrodes, with means designed to direct a targeted animal entering the trap housing into and through a pathway leading to a source of bait beyond the electrodes while minimizing the likelihood that the animal will back out or escape from the trap before engaging the electrodes, and while precluding accidental contact with the electrodes by a user, a pet or non-targeted animal that could inadvertently fire the trap.

Although the concepts of the instant invention are equally applicable to traps for animals of any size, devices of this type are primarily utilized in connection with the trapping of rodents such as mice and rats and the description will, therefore, focus on this application.

2. The Prior Art

Animal traps have been around for hundreds of years and include many different designs. Most common is the typical rodent snap trap that utilizes a spring and a snapping bar to kill the target animal. These designs can be unpleasant to handle and pose a danger to the consumer setting the trap.

Due to these problems, many other types of animal traps, particularly rodent traps, have been utilized. One alternative to the snap trap is to use electricity to kill the target animal. Traps of this nature are typically easier to set and do not produce an unsightly result when the consumer catches a rodent or the like. However, other issues such as safety and efficacy can be a concern. Professional pest control companies have complained of possible dangers in using such traps; additionally, it is not uncommon for target animals to avoid electrocution by backing out of the trap. Attempts to avoid these problems have been less than successful.

In U.S. Pat. No. 5,269,091 to Johnson et al., a flexible plate is charged with a base plate. When the pest enters the trap, the pest presses the flexible plate into contact with the base plate. This contact completes the circuit and a high voltage is applied to the pest. The problem with this type of device is that voltage only occurs when the pest makes contact with the flexible plate. When the pest is initially shocked it may move and fail to receive sufficient voltage to exterminate it.

Johnson et al. U.S. Pat. No. 5,949,636 discloses a portable pest electrocution device with a resistive switch to sense the presence of a pest between a pair of electrodes. One of the electrodes is set at a high voltage and the other is set to ground. The ground electrode is a separate stake shaped electrode which is placed physically in the ground. When the pest enters the trap, contact is made, and a timer begins for a set period of time. After timing out, the timer deactivates the power to the electrodes. A problem with this device is that a separate ground stake is necessary. It is costly and cumbersome. If the user forgets or misplaces the separate ground stake, the device does not work correctly and thus will be useless.

The subject matter of the Johnson et al. patents is incorporated herein in its entirety by reference.

Copending, commonly assigned, U.S. Pat. No. 6,609,328 issued Aug. 26, 2003 (the '328 patent), the subject matter of which is also incorporated herein by reference in its entirety, overcomes many of the problems associated with the Johnson et al. patented products by providing an electric or electronic trap of the inclined plane or teeter-totter type wherein the target animal entering the trap passes over the fulcrum of a tilting floor or platform and closes a circuit initiating an electrical shock to kill the animal. While the '328 patent discloses improved circuitry for such an animal trap, the mechanical aspects of tilting floor traps, while effective, require significant design features to insure the targeted animal does not escape before it engages the electrodes and to preclude accidental engagement with the electrodes by a less sophisticated or curious person such as a young child.

Other prior art electric or electronic traps are particularly complicated and costly to manufacture making them poor candidates for mass marketing. Deficiencies in their reliability and safety features have also minimized the commercialization of devices of this nature.

SUMMARY OF THE INVENTION

A primary object of this invention is to provide an animal trap, particularly a mouse or rat trap, which will quickly and efficiently electrocute a targeted animal, is simple and inexpensive to manufacture and highly reliable and completely safe in use.

A further object of this invention is the provision of an inclined plane electric or electronic animal trap such as disclosed in the '328 patent modified to incorporate a diverter plate or the like making it difficult for an animal stepping from an electrified platform which functions as a first electrode to reverse direction as it contacts the second electrode at the end of the platform.

Another object of this invention is to provide an electric or electronic animal trap utilizing, if desired, the improved circuitry of the '161 application, but modifying the mechanical structure of the device to eliminate the sometimes problematic operation and effectiveness of the inclined plane or tilting floor design disclosed in the '161 application, and replacing the same with a fixed barrier or diverter system that has no moving parts and, while minimizing or preventing escape of the animal, totally precludes the accidental simultaneous engagement of the electrodes and actuation of die circuitry by blocking the pathway between the entrance opening and at least the second electrode to preclude the introduction of an extraneous element by an inexperienced or curious user.

Yet another object of this invention is to provide a mouse or rat trap comprising at least a pair of spaced, oppositely angled, barrier elements immediately within the entrance opening, diverting a target animal into a maze-like path as it passes into the trap because of its innate curiosity or to seek a quantity of bait, such as peanut butter or the like, positioned beyond the electrodes. Once the animal passes the first barrier, it no longer sees the opening and is encouraged to simply move forward, rather than to attempt to back out or escape from the trap before engaging and actuating the electronic circuitry. The same barrier system that minimizes the likelihood of escape of the target animal also bars the entry of a relatively straight element such as screwdriver of a child's finger that could accidentally close the circuit and injure the trap user and/or damage the trap.

A further object of this invention is to provide a trap of the type described either with the angled diverters or the inclined plane, but incorporating a plate or the like extending downwardly from the housing cover intermediate the spaced electrodes that provides limited space between its lower edge and the floor of the housing to force a target animal to squeeze thereunder making it more difficult for the animal to reverse itself when it contacts the second electrode.

A still further object of this invention is to incorporate a pair of cooperating diverters or barriers, one extending partway down to the floor from the cover and the other extending partway up from the floor toward the cover which together block direct access to the electrodes by a straight element inserted through the entrance opening.

From the foregoing, it is obvious that the instant invention provides an electric or electronic animal trap which, in all embodiments, is highly efficient and reliable, providing excellent protection against inadvertent or accidental damage to the user of the trap or the trap itself.

Other and further objects of this invention will be readily understood by those with ordinary skill in the art with particular reference to the following detailed description of the preferred embodiments in combination with the accompanying drawings.

BRIEF DESCRIPTION OF THE DRAWINGS

Like reference characters refer to like parts throughout the several views of the drawings.

DETAILED DESCRIPTION OF THE PREFERRED EMBODIMENTS

Figure 1:
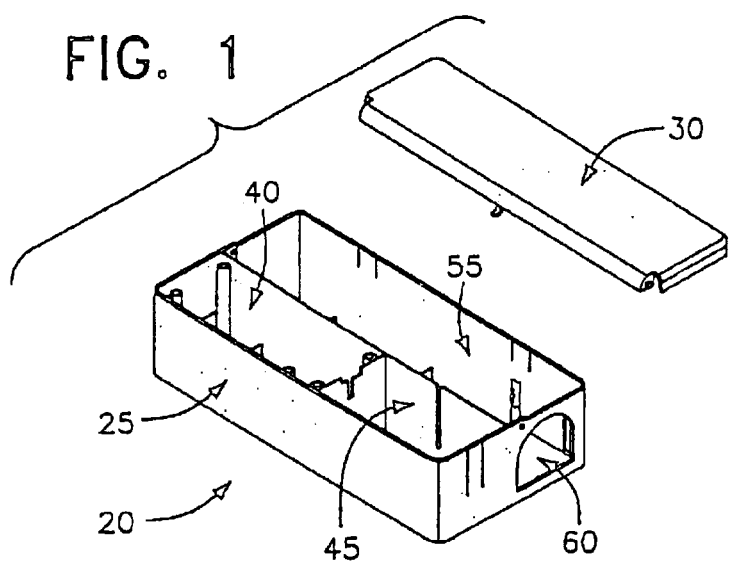
FIG. 1 is an exploded view of a general housing design for the various embodiments of trap assemblies according to this invention.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

A housing for the various trap embodiments of this invention is illustrated at 20 in FIG. 1 and can be formed of plastic, metal or other suitable material. The housing 20 includes a base 25 and a simple cover 30 hingedly secured thereto in a well known manner. The base 25 is divided longitudinally by a separator 35 to provide compartments on one side for reception of the electronic circuitry (not shown) at 40 and batteries (not shown) at 45. The specifics of the electronic circuitry and energizing source are not critical to the instant inventive concepts and the '328 patent may be referred to for preferred embodiments which may be useful in the traps of this invention. However, it is to be understood that other circuitry may be substituted therefore without departing from the instant inventive concepts and, additionally, as an alternative to the use of batteries, appropriate means can be included to energize the trap from an a-c source or even an external d-c source. Additionally, as disclosed in the '328 patent, a pair of contacts (not shown) can be incorporated in the base 25 and cover 30 so that when the cover 30 is lifted to access the interior of the base 25, the circuit is broken to preclude injury to the user.

Figure 3:
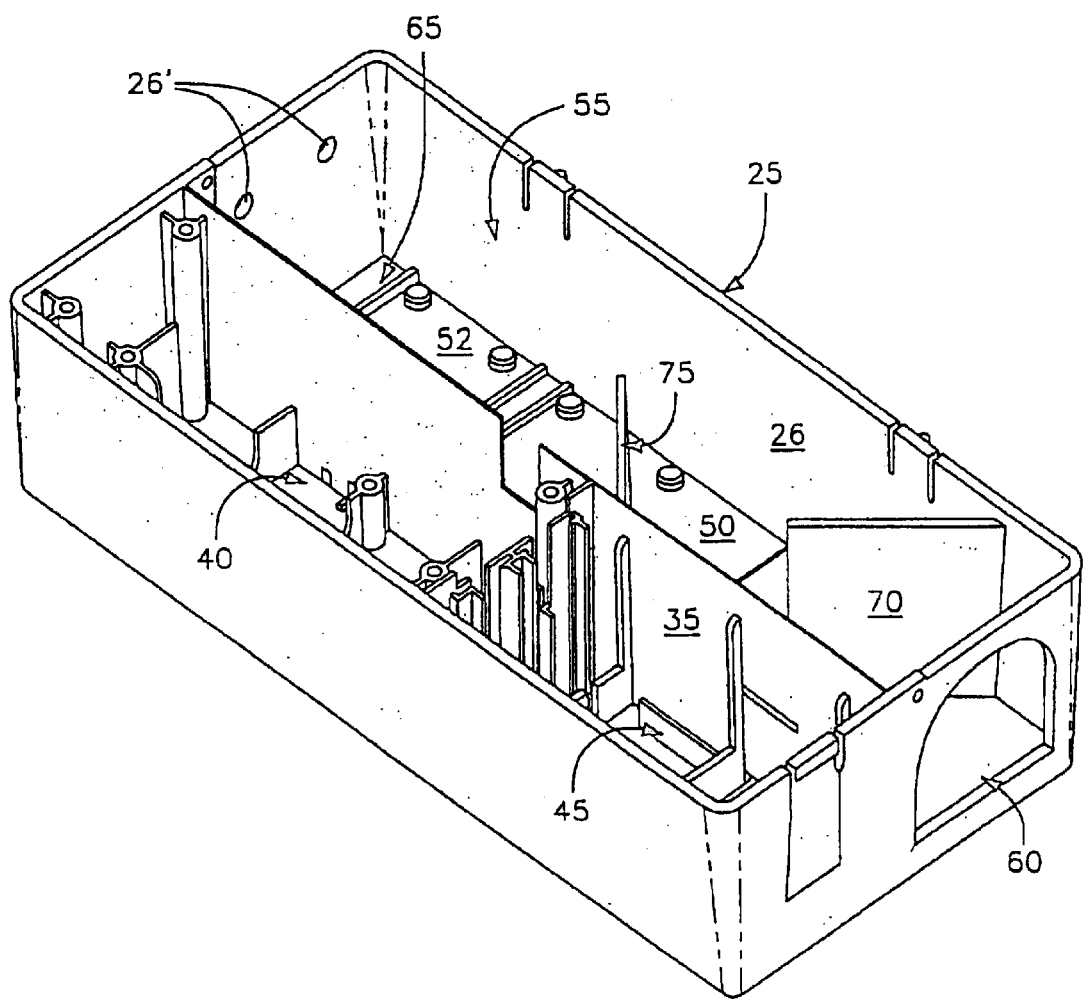
FIG. 3 is perspective view of the trap housing base of the embodiment of FIG. 2.
Figure 2:
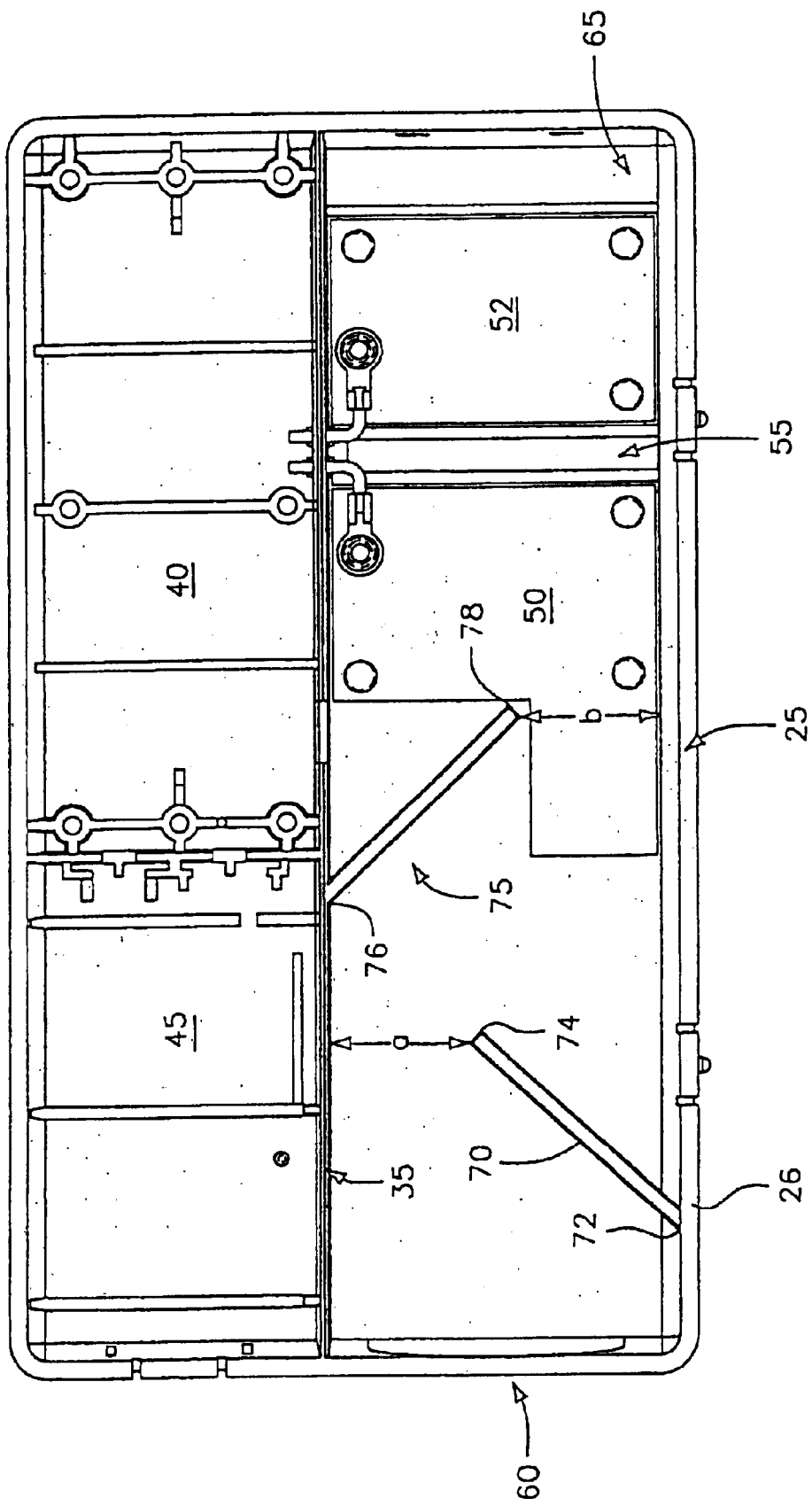
FIG. 2 is a top plan view of the base of one preferred embodiment of an animal trap according to the instant inventive concepts with the cover and electronic components removed for illustrative clarity.
Figure 4:
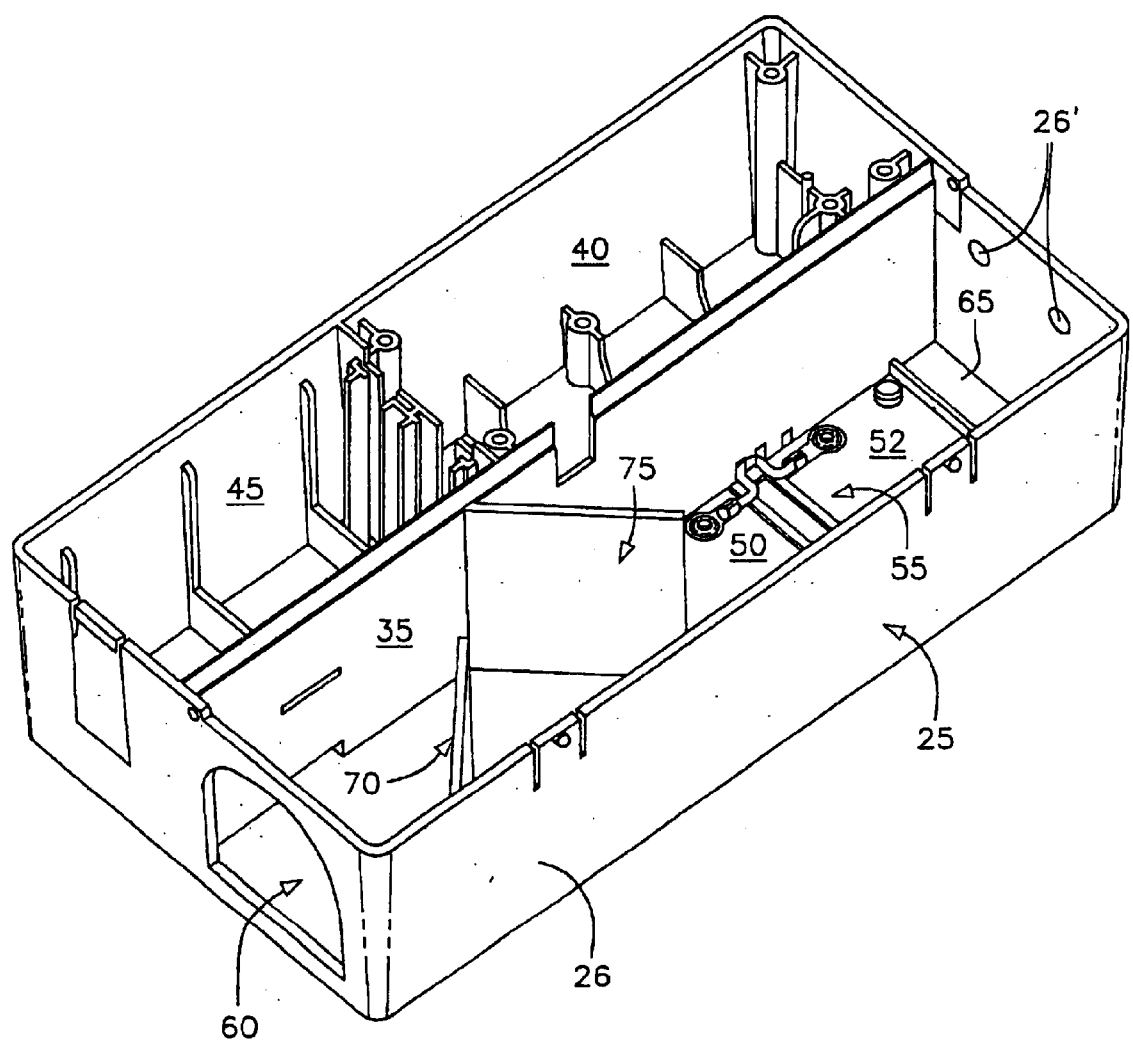
FIG. 4 is a perspective view of the trap housing base of the embodiment of FIG. 2 from another angle.

One form of two-diverter trap according to this invention is illustrated in FIGS. 2-4 and includes a pair of spaced charge plates or electrodes 50, 52 located in the "killing" chamber 55 and electrically connected in a well-known manner to the electronic circuitry so that contact with both charge plates simultaneously by a target animal will actuate an electronic charge to effectively kill the animal. A principle feature of this embodiment of the instant invention is the mechanism by which an animal entering the trap is directed along a tortuous path-or maze to make contact with the charge plates 50, 52. In this respect, a pathway is defined between the side wall 26 of the housing base 25 and the separator 35 from the trap opening entrance 60 to a bait receiving location 65, with the charge plates 50, 52 interposed in this path. Openings such as 26' in the side wall, or elsewhere such as the openings 30a' seen in the cover of FIGS. 5 and 6, may be provided to permit the odor of bait, if any, to exude to the atmosphere and attract the animal to the trap.

In lieu of the tilting platform trapping mechanism of the '161 application, this embodiment of the instant invention substitutes at least two fixed barriers or diverter members 70, 75 positioned between the opening 60 and the killing chamber 55. The diverter 70 has one end 72 fixed to the side wall 26 of the base 25, and extends at approximately a 45° angle toward the killing chamber, with the end 74 stopping short of the separator 35 to define a space "a" therebetween for passage of an animal. The second diverter 75 has one end 76 fixed to the separator 35, and extends at approximately an oppositely directed 45° angle toward the killing chamber, with its second end 78 spaced from the side wall 26 by a distance "b", again sufficient for an animal to pass through. Each of the diverters 70, 75 extend upwardly at least substantially the full height of the side walls of the housing 25 so as to preclude an animal passing over the tops thereof when the cover 30 is closed.

As will be seen best in FIG. 2, the end or edge portions 74 of the first diverter 70 and the end or edge portions 78 of the second diverter 75 overlap so that an animal entering the trap opening 60 does not have a clear view along the pathway, but must pass through a "maze" formed at "a" and "b" to reach the bait 65. Since mice and other such small animals are curious and attracted to dark spaces, the pathway from the opening 60 will entice them into the trap housing, whether a bait is present or not. However, placement of a quantity of odoriferous material such as peanut butter at the end 65 of the pathway will further attract the animal into the killing chamber 55.

Once the animal passes the first diverter 70 on its way to the space "b", it no longer has a clear view of the opening 60 behind it and is discouraged from reversing its direction. Thus, as the animal progresses along the pathway from the opening 60, through the spaces "a" and "b" toward the bait-receiving area 65, it will step onto the charge plates 50, 52, which are slightly spaced apart, but close enough that the animal must contact both plates simultaneously before reaching the bait at 65. Upon doing so, the circuit will be closed by the animal's body and an electrical charge will kill the animal. The barrier 75 also acts as a blocking mechanism inhibiting the animal from retreating from contact with the charge plates 50, 52 after the initial shock, insuring continued contact until the animal is electrocuted. The cover 30 can then be opened to break the circuit and dispose of the animal, following which the trap can be reused in an obvious manner.

Although only two barriers or diverters are shown at 70, 75 and for all practical purposes, this is sufficient to effect both the maze-like pathway and to protect against accidental contact with both of the charge plates 50, 52, from a straight element such as a screwdriver or the like (not shown), additional barriers can be included to render the path even more tortuous without diverging from the instant inventive concepts.

Figure 5:
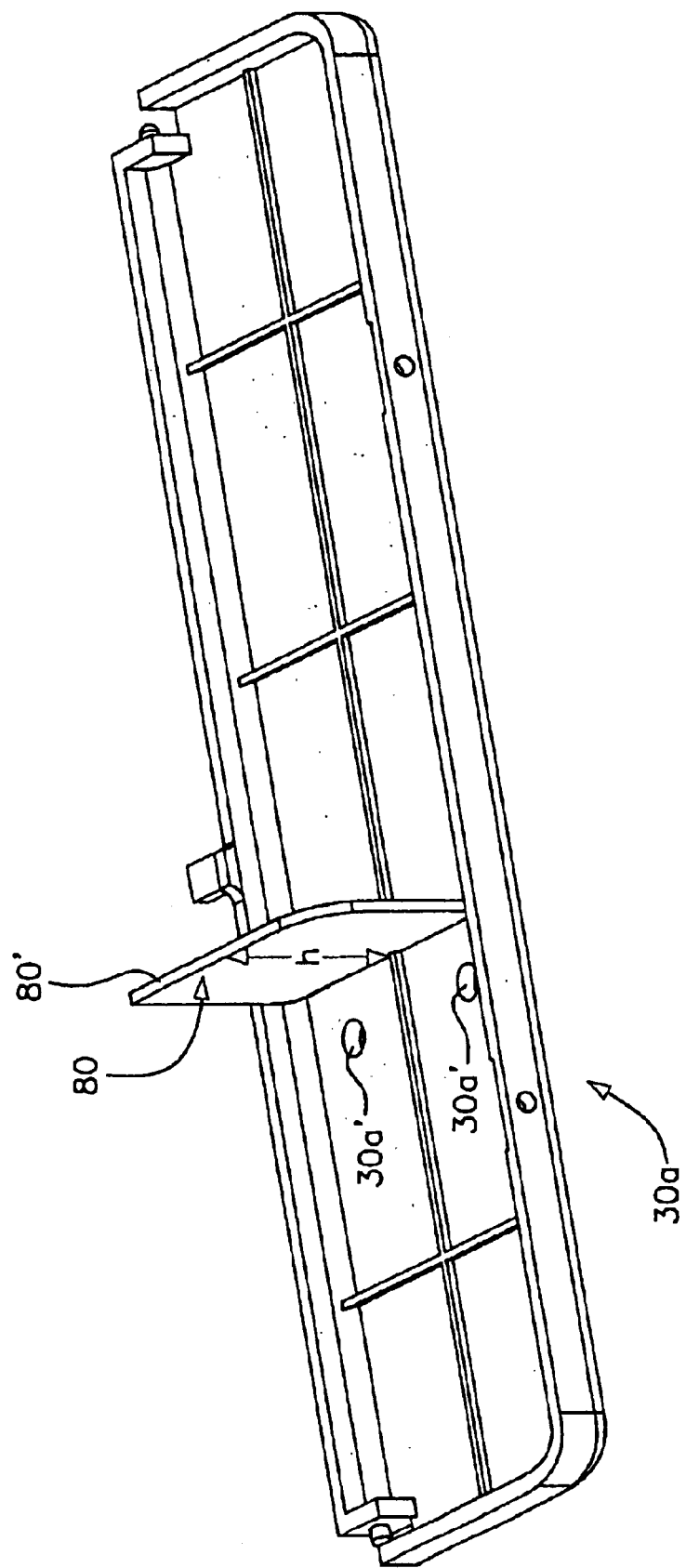
FIG. 5 is a perspective view of a modified cover, for a trap housing according to this invention carrying a diverter or barrier which extends into the trap intermediate the spaced electrodes when the cover is closed.
Figure 6:
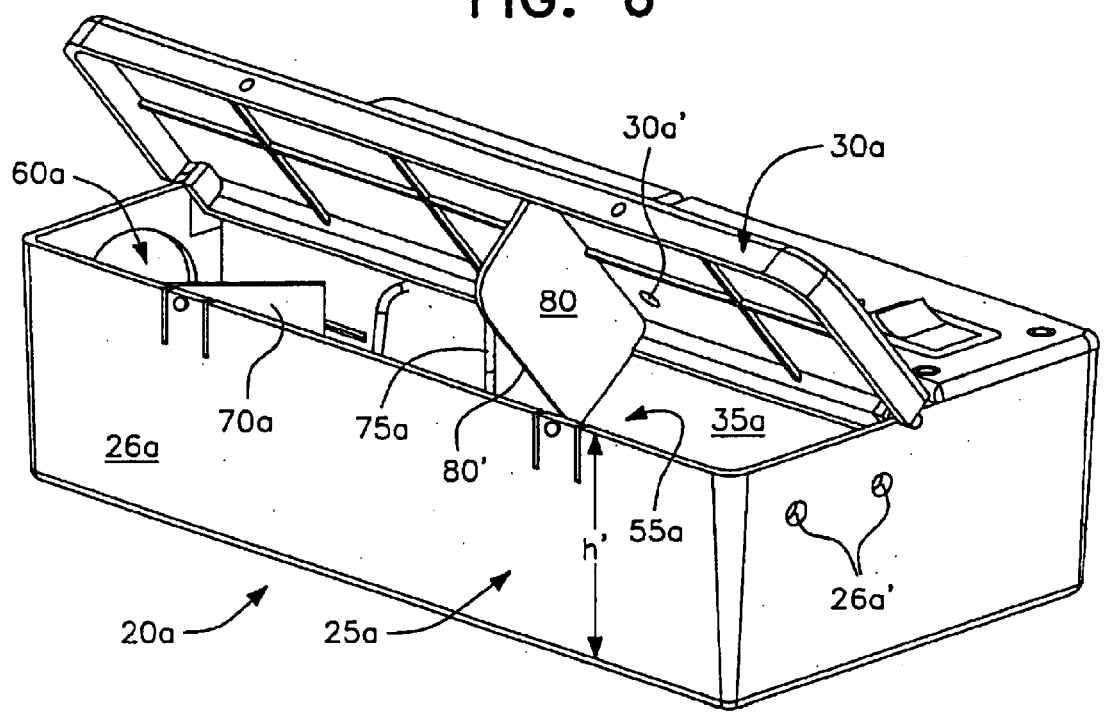
FIG. 6 is a perspective view of a trap similar to the embodiment of FIG. 2, but with a modified cover such as seen in FIG. 5 in a partially closed position.

Referring now to FIGS. 5 and 6, a modified trap incorporating a third barrier is illustrated. In this trap, parts similar to the embodiment of FIGS. 1-4 are designated by the same reference numeral followed by the suffix "a".

For all intents and purposes, the base 25a of the trap 20a is identical to the base 25 of the trap 20. However, the cover 30a of the trap 20a differs from the cover 30 of the trap 20 in having affixed to the underside thereof a third diverter or barrier 80 which is positioned along the length of the cover 30a to extend into the space between the electrodes 50, 52 when the cover 30a is pivoted to its closed position. The height "h" of the barrier 80 is less than the height "h'" of the side walls of the housing 25a to provide a limited space between the lower edge 80' of the barrier 80 and the floor of the base 25a to force a target animal to squeeze under the barrier 80 as it moves toward the bait. Thus, at the time the animal's front paws engage the second electrode and energize the electrocuting circuit, its body is extended and contorted such that withdrawal from contact with the electrodes is rendered more difficult.

Although the diverter 80 is preferably carried by an openable cover, it could be carried by a fixed cover if access to the chamber for disposing of the electrocuted carcasses is provided elsewhere, or, for that matter, it could be fixed to the sides of the pathway. While it is evident that a diverter such 80 is best used in conjunction with the angled diverters as shown in FIGS. 5 and 6, it has independent utility in minimizing escape from an electric or electronic trap of other constructions. See, for example, the discussion below of the embodiments of FIGS. 7 and 8 and FIGS. 9 and 10.

The two-diverter trap shown in FIGS. 2-4 of the drawings was tested both with the diverters illustrated and without diverters. Additionally, traps containing a third diverter as seen in FIGS. 5 and 6 were tested. The tests were conducted on both male and female wild Mus Musclus, the house mouse, of varying size and age. Mice were collected from wild populations on farms and adjusted in the laboratory for two to three weeks before being used in the tests.

Five field mice were placed in an arena measuring 4×8×3 ft (width by length by height). Within the arena, a shelter containing shredded paper towels was placed at one end. On the opposite end of the arena, a food (Purina lab chow) and water source were placed. The 5 mice were then allowed to acclimate for a period of 8 hours within this arena. During this period, the lights were left "on" to simulate daytime. At the end of this period, the corresponding test traps were placed into the arena for a period of approximately 16 hours. All traps were baited with creamy peanut butter (Shur-Fine brand). During this time, the lights were turned "off" to simulate nighttime. Five traps were placed in each arena with each arena considered a replication. Three arenas were used during each testing period.

The traps were evaluated based on three criteria: (1) Kill rate (the number of mice killed divided by total number of traps); (2) Escape rate (where the mouse has triggered the trap but was not killed); and (3) Interaction (the total number visited by mice resulting in either a kill or escape).

Sample t-tests were used to determine the significant differences between the traps with and without diverters (Windows 2000, Excel, Microsoft Corporation).

Kill Rate: The traps with two and three diverters had mean kill rates of 83.4% and 100%, respectively, compared to 43.4% for traps without diverters. When analyzed using a t-test at 95% probability, the kill rate of the traps with two and three diverters was significantly greater than the traps with no diverters. (See Tables 1–3)

Escape: The traps with two and three diverters had mean escape rates of 3.33% and 0%, respectively, compared to 53.33% for the trap without diverters. When analyzed using a t-test at 95% probability, the traps without diverters had a significantly higher escape rate compared to the traps with two and three diverters. (See Tables 1–3)

Interaction: The traps with two and three diverters had mean interaction rates of 86.67% and 90%, respectively, compared to 96.67% for the trap without diverters. When analyzed using a t-test at 95% probability, the interaction was not significantly different. (See Tables 1–3)

The traps were identical to each other with the exception of the two and three diverters, yet the trap with the diverters performed significantly better, killing more mice with fewer escapes without significantly reducing interaction.

Although not wishing to be bound by an explanation of these results, there are two theories for why the diverters reduce the escape rate. First, as the mouse is moving through the trap without diverters, it moves slowly. When it touches the second plate and gets shocked, it is able to back off. In the trap with diverters, the second diverter acts as a barrier, preventing the mouse from retreating. In one instance, there was fur observed on one of the diverters of the trap that had an escape, indicating that the barrier did interfere with the retreat of the mouse.

The second theory is based on the space in the trap. The diverters restrict the movement of the mouse until it gets dose to the second plate and peanut butter. At this point, the trap opens up to the entire width of the tunnel. It is believed that the mouse is more tentative in the confined space in the diverter areas, but once it sees the open space and the peanut butter, it is more willing to commit. With more of the momentum of the mouse going forward, it is less likely for it to retreat once the shock is triggered.

Finally, traps with three diverters had an even greater kill rate and lower escape rate. Results have shown in these tests that mice not only move back away from the electric plates after being shocked, but also move up. Traps with a third diverter prevent the mouse from jumping in this upward direction to escape. In fact, dead mice removed from these traps after being shocked have indentations on their back from hitting the third diverter.

In conclusion, both traps with two and three diverters are significantly better in controlling mouse populations than traps without diverters. Mice have an instinctive behavior to avoid being shocked, however, this behavior can be predicted and prevented through the use of diverters in the trap design.

Regardless of the theory, the results are self-evident from the data below:

TABLE 1

Electronic Mouse Trap with Two Diverters

Percent Kill

| # Mice Killed/Rep (5 mice per Rep) | | | | | | Total Killed | AVE Per Rep | SD | % Mortality |
|---|---|---|---|---|---|---|---|---|---|
| 1 | 2 | 3 | 4 | 5 | 6 | | | | |
| 5 | 4 | 3 | 4 | 4 | 5 | 25 | 4.17 | 0.75 | 83.33 |

Percent Interaction

| # Mice Interacted/Rep (5 mice per Rep) | | | | | | Total Interaction | AVE Per Rep | SD | % Interaction |
|---|---|---|---|---|---|---|---|---|---|
| 1 | 2 | 3 | 4 | 5 | 6 | | | | |
| 5 | 4 | 3 | 5 | 4 | 5 | 26 | 4.33 | 0.62 | 86.67 |

Percent Escape

| # Mice Escaped/Rep (5 mice per Rep) | | | | | | Total Escapes | AVE Per Rep | SD | % Escape |
|---|---|---|---|---|---|---|---|---|---|
| 1 | 2 | 3 | 4 | 5 | 6 | | | | |
| 1 | 3 | 2 | 4 | 2 | 4 | 16 | 2.67 | 1.21 | 3.33 |

TABLE 2

Electronic Mouse Trap with Three Diverters

Percent Kill

| # Mice Killed/Rep (5 mice per Rep) | | | | Total Killed | AVE Per Rep | SD | % Mortality |
|---|---|---|---|---|---|---|---|
| 1 | 2 | 3 | 4 | | | | |
| 5 | 3* | 5 | 5 | 15 | 5.00 | 0.00 | 100 |

Percent Interaction

| # Mice Interacted/Rep (5 mice per Rep) | | | | Total Interaction | AVE Per Rep | SD | % Interaction |
|---|---|---|---|---|---|---|---|
| 1 | 2 | 3 | 4 | | | | |
| 5 | 3* | 5 | 5 | 15 | 5.00 | 0.00 | 100 |

Percent Escape

| # Mice Escaped/Rep (5 mice per Rep) | | | | Total Escapes | AVE Per Rep | SD | % Escape |
|---|---|---|---|---|---|---|---|
| 1 | 2 | 3 | 4 | | | | |
| 0 | 0 | 0 | 0 | 0 | 0.00 | 0.00 | 0 |

Two mice escaped from test arena.

TABLE 3

Electronic Mouse Trap without Diverters

Percent Kill

| # Mice Killed/Rep (5 mice per Rep) | | | | | | Total Killed | AVE Per Rep | SD | % Mortality |
|---|---|---|---|---|---|---|---|---|---|
| 1 | 2 | 3 | 4 | 5 | 6 | | | | |
| 4 | 2 | 3 | 0 | 3 | 1 | 13 | 2.17 | 1.47 | 43.33 |

Percent Interaction

| # Mice Interacted/Rep (5 mice per Rep) | | | | | | Total Interaction | AVE Per Rep | SD | % Interaction |
|---|---|---|---|---|---|---|---|---|---|
| 1 | 2 | 3 | 4 | 5 | 6 | | | | |
| 5 | 5 | 5 | 4 | 5 | 5 | 29 | 4.38 | 0.41 | 96.67 |

Percent Escape

| # Mice Escaped/Rep (5 mice per Rep) | | | | | | Total Escapes | AVE Per Rep | SD | % Escape |
|---|---|---|---|---|---|---|---|---|---|
| 1 | 2 | 3 | 4 | 5 | 6 | | | | |
| 1 | 3 | 2 | 4 | 2 | 4 | 16 | 2.67 | 1.21 | 53.33 |

Figure 7:
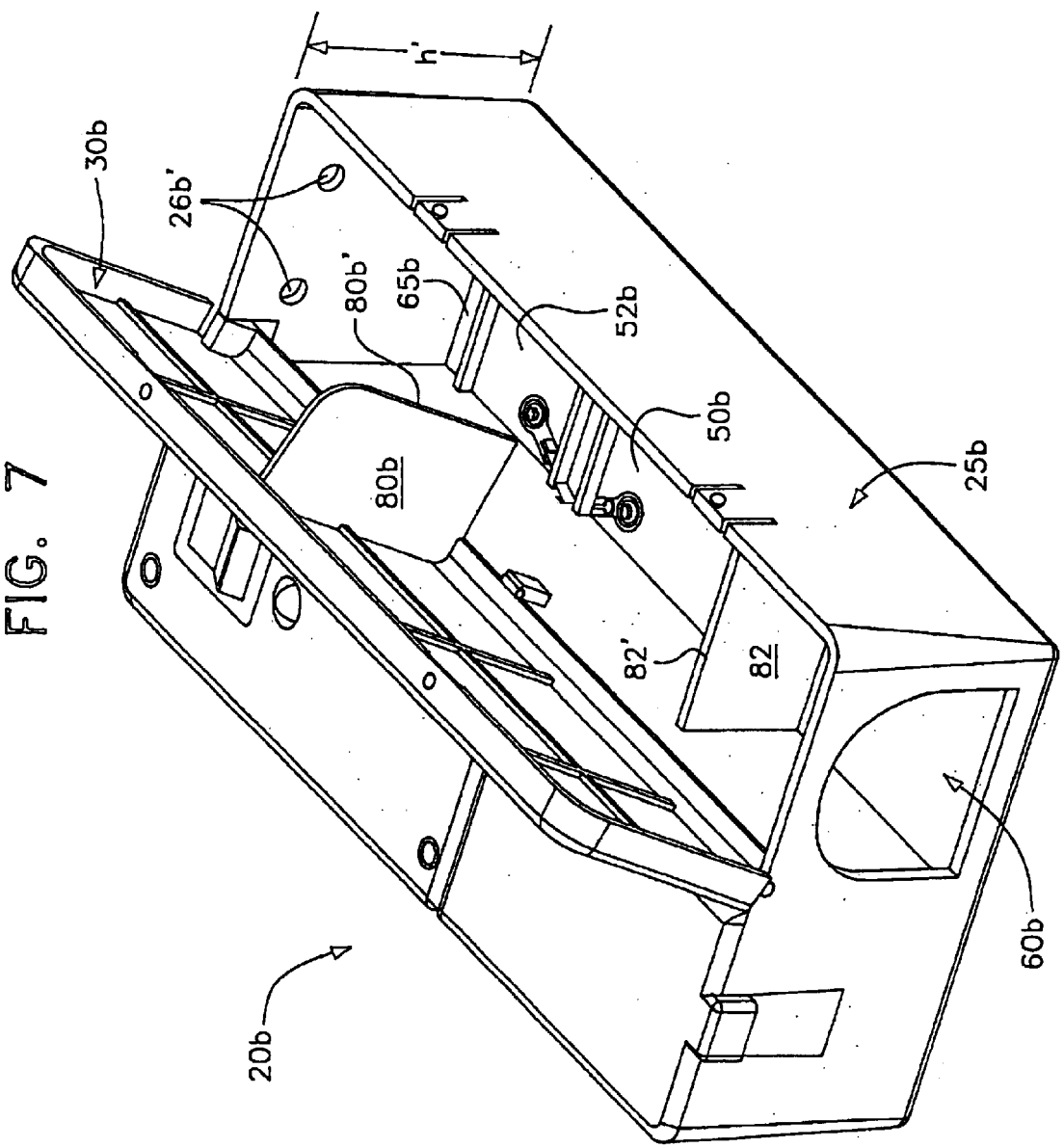
FIG. 7 is a perspective view of yet another embodiment of animal trap according to this invention incorporating a cover such as seen in FIG. 5, but replacing the angled barriers of the embodiment of FIG. 2 with a diverter or barrier extending upwardly from the floor toward the cover intermediate the entrance opening and the downwardly extending plate carried by the cover.
Figure 8:
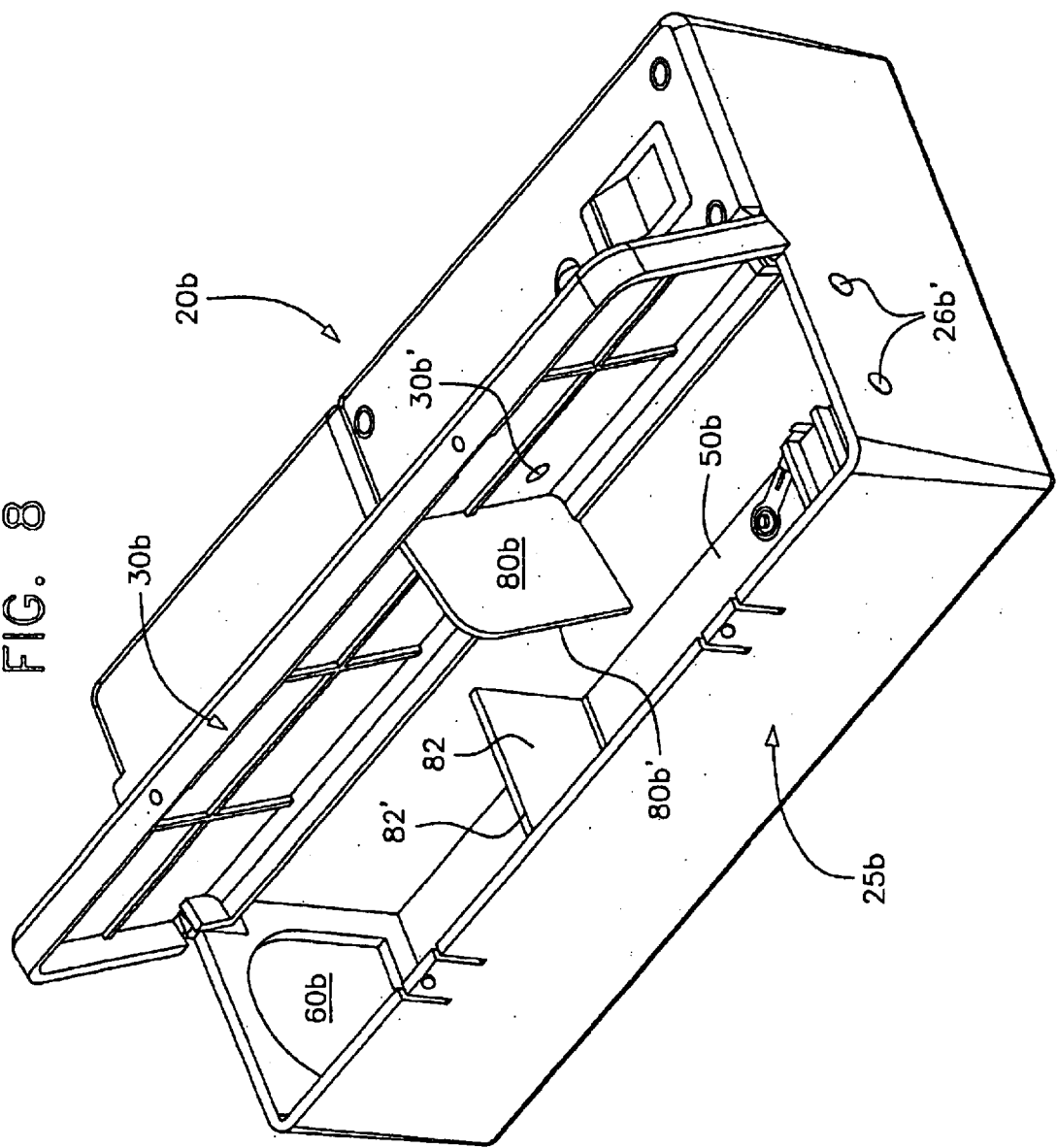
FIG. 8 is a perspective view of the trap of FIG. 7 from another angle.

Reference is now made to FIGS. 7 and 8, where yet another embodiment of the instant invention is illustrated, with parts similar to those of the previous embodiments being designated by the same reference numeral followed by the suffix "b".

Again, for all intents and purposes, the base 25b of the trap 20b is identical to the base 25 of the trap 20 or the base 25a of the trap 20a, with the exception that the angled diverters have been eliminated. In this embodiment, the cover 30b is identical to the cover 30a and includes a downwardly extending plate or barrier 80b positioned along its length to fit in the space between the electrodes 50B, 52b when the cover 30b is pivoted to its closed position. Additionally, the trap 20b includes an upwardly extending plate or baiter 82 interposed between the entrance opening 60b and the downwardly depending plate 80b. The height of each of the plates 80b, 82 is less than the height h' of the side walls of the housing 25b to provide a limited space over the upper edge 82' of the plate 82 and under the lower edge 80b' of the plate 80b for the target animal to pass. According to a preferred feature of this invention, the upper edge 82' of the plate 82 is spaced from the floor of the housing 25b by a distance greater than the distance from the lower edge 80b' of the plate 80b whereby the plates 80b, 82 together define a barrier blocking simultaneous access to the electrodes 50b, 52b from a straight element passing through the entrance opening 60b.

Thus, with this embodiment, the limited space between the downwardly depending plate 80b and the floor of the housing 25b forces the target animal to squeeze thereunder making it almost impossible for the animal to pull back once its front paws have contacted the second electrode 52b. The upwardly extending plate 82 also functions to discourage a target animal from reversing its path because of the difficulty in squeezing back through the space between tie upper edge 82' of the plate 82 and the undersurface of tie cover 30b.

Figure 9:
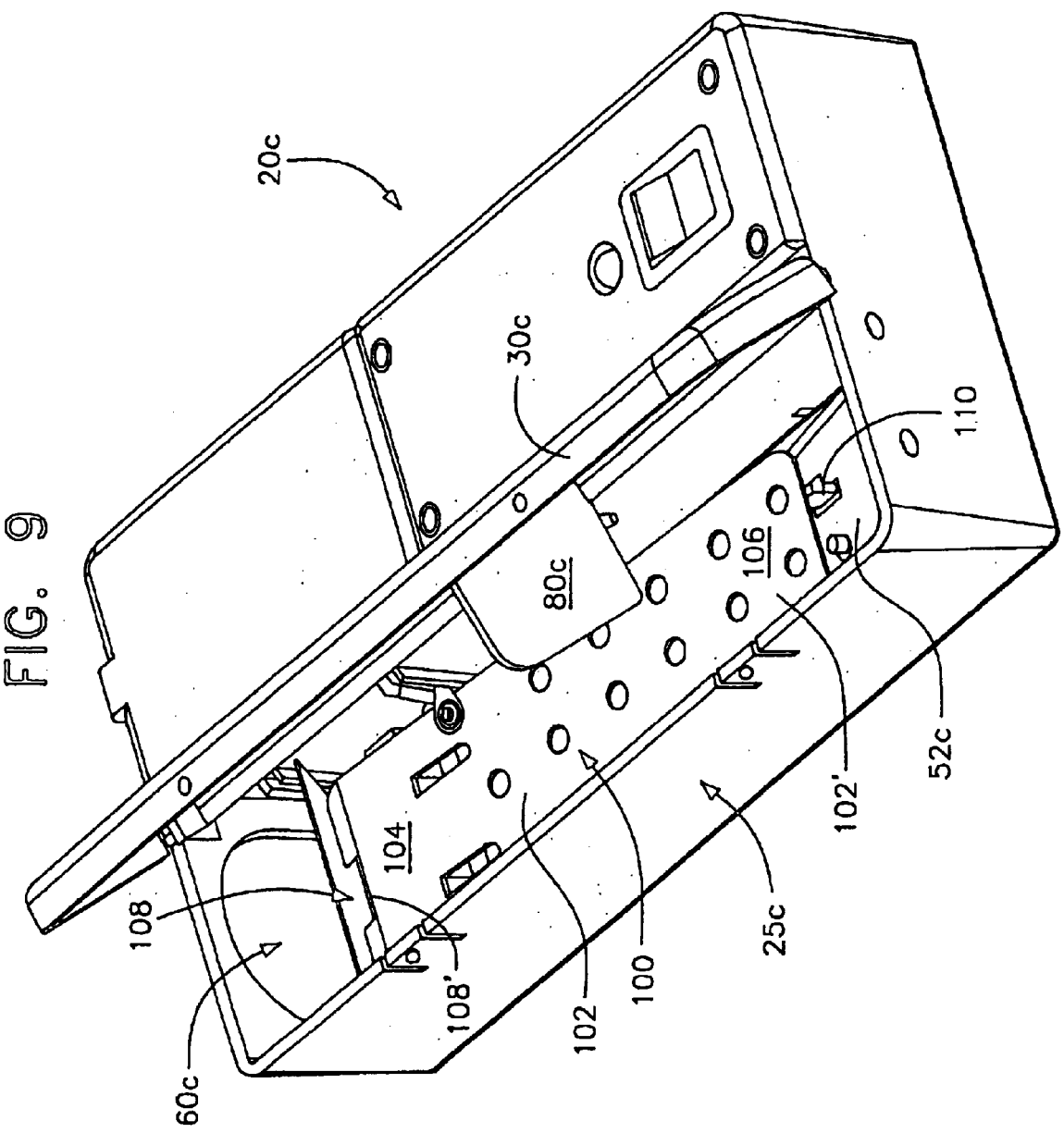
FIG. 9 is a perspective view of an embodiment of animal trap according to this invention including an inclined plane trap assembly of the type seen in the '161 application in combination with a unique cover such as seen in FIG. 5 to minimize the possibility that a target animal will reverse itself before being electrocuted.
Figure 10:
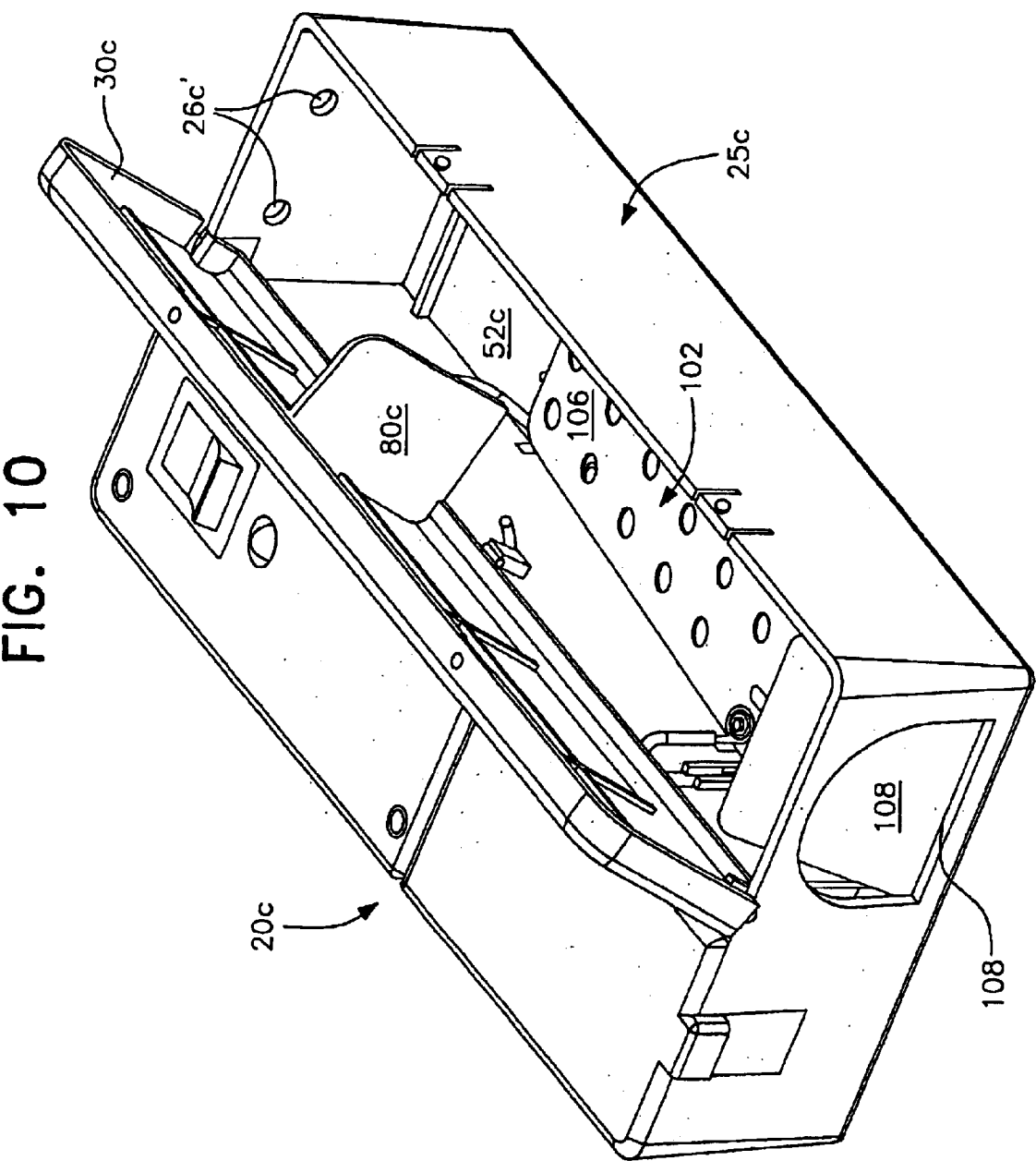
FIG. 10 is a perspective view of the trap of FIG. 9 from another angle.

The embodiment of FIGS. 9 and 10 is included to illustrate that, even if an inclined plane or tilting platform assembly is incorporated in a trap according to the instant invention, the inclusion of a cover of the type seen in FIG.

5, including a downwardly extending plate which is positioned intermediate the electrode members when the cover is closed, enhances the effectiveness of the trap by minimizing the likelihood that the target animal can back away from the second electrode before it is electrocuted. In this embodiment, parts similar to the previous embodiments are designated by the same reference numeral followed by the suffix "c". For all intents and purposes, the trap 20c is very similar to the trap 20a of FIGS. 5 and 6, with the exception that an inclined plane or tilting platform assembly 100 is incorporated adjacent the entrance opening 60c. The manner in which the tilting platform or inclined plane assembly 100 operates is well known. Reference may be had to the '161 application for further details. As shown, the inclined plane trap assembly 100 includes a platform element 102 having a first end portion 104 juxtaposed to the entrance opening 60c and a second end portion 106 juxtaposed to the second electrode 52c. A pivot element (not shown) underlies and supports the platform element 102 intermediate its end portions 104, 106 for tilting movement of the platform element 102 in a well known manner between a first position in which the first end portion 104 is lowered and the second end portion 106 is raised, and a second position in which the first end portion 104 is raised and the second end portion 106 is lowered. A door member 108 is hinged at its lower edge 108' adjacent to the entrance opening 60c for pivotal movement between a lowered position in which the door member 108 rests on the first end portion 104 of the platform element 102 when the platform element is in its first position to provide access to the passageway by a target animal through the entrance opening 60c, and a raised position in which the door member 108 is lifted by upward movement of the first end portion 104 of the platform element 102 when the platform element 102 is moved from its first position to its second position. The door member 108 is biased toward its lowered position under the force of gravity, the weight of the door member 108 on the first end portion 104 of the platform element 102 when the door member 108 is in its lowered position normally maintaining the platform element 102 in its first position. However, the weight of a target animal on the second end portion 106 of the platform element 102 tilts the platform element 102 to its second position when the target animal passes from the entrance opening 60c beyond the pivot clement thereby lifting the door member 108 to its raised position, blocking escape through the entrance opening 60c by a target animal on the platform element 102.

In the embodiment shown, the platform element 102 is connected to the circuitry (not shown) to electrify the same to function as a first electrode. An insulator 110 in the form of a plastic or rubber element underlies the second end portion 106 of the platform clement 102 so that the target animal is only shocked when its rear paws are on the platform element 102 and its front paws are on the second electrode 52c. In this embodiment, the platform element 102, in either of its positions, blocks simultaneous contact with both of the electrodes by a straight element passing through tie entrance opening 60c.

When the cover 30c is closed, the downwardly depending plate 80c is interposed between the end portion 106 of the platform element 102 and the second electrode 52c, forcing a target animal to squeeze under the lower edge 80c' of the plate 80c in its attempt to get to the bait. In doing so, it must then step on the second electrode 52c and, for all intents and purposes, is precluded from pulling back before the circuitry is closed by the animal's body and the animal is electrocuted.

Thus, it will be seen that, even if a tilting platform or inclined plane trap is desired, the incorporation of the downwardly depending diverter or barrier plate carried by the trap housing cover as seen in the embodiment of FIGS. 9 and 10 adds further advantages in both minimizing the likelihood of escape by a target animal before electrocution and, additionally, by cooperating with the platform element to make it virtually impossible for a screwdriver or a child's finger inserted through the entrance opening 60c to simultaneously contact both the platform element or first electrode 102 and the second electrode 52c.

In summary, in each of the embodiments of this invention, at least one diverter member is interposed in the pathway from the entrance opening along the interior of the housing to the second electrodes to discourage a target animal approaching the second electrode from reversing direction. Additionally, at least one barrier member is provided to block simultaneous contact with both of the electrodes by a straight element passing through the entrance opening. For the embodiments of FIGS. 2-8, there are literally no moving mechanical parts other than the cover so that the animal trap is inexpensive to manufacture, easy to maintain and highly effective in operation. Moreover, even with an inclined plane trap, the extra barrier plate enhances its effectiveness.

The foregoing descriptions and drawings should be considered as illustrative only of the principles of the invention. As noted, the invention may be configured in a variety of shapes and sizes and is not limited by the dimensions of the preferred embodiment. Numerous applications of the present invention will readily occur to those skilled in the art. Therefore, it is not desired to limit the invention to the preferred embodiments or the exact construction and operation shown and described. Rather, all suitable modifications and equivalents may be resorted to, falling within the scope of the invention.

What is claimed is:

1. An animal trap comprising a housing including a base having a floor and side walls and defining an interior chamber, and a cover for said chamber, an entrance opening communicating with said chamber, a pathway leading from said entrance opening along the interior of said housing, first and second spaced electrodes interposed in said pathway and circuitry electrically connected to said electrodes to initiate an electrical shock when said electrodes are simultaneously contacted by a target animal, said first and second electrodes each having a leading edge closer to said entrance opening and a trailing edge further from said entrance opening, said leading edge of said second electrode being spaced along said pathway from said trailing edge of said first electrode, at least one first diverter member interposed in said pathway intermediate said entrance opening and at least said leading edge of said second electrode to discourage a target animal approaching said second electrode from reversing direction, said at least one first diverter member blocking simultaneous contact with both of said electrodes by a straight element passing through said entrance opening, and a barrier member extending downwardly into said chamber intermediate said entrance opening and at least said leading edge of said second electrode, said barrier member having a lower edge portion spaced from said floor of said base a distance forcing a target animal to squeeze under said barrier member as it approaches said second electrode.

2. The animal trap of claim 1, further including a bait-receiving location at an end of said pathway remote from said entrance opening.

3. The animal trap of claim 2, further including apertures through portions of said housing to permit the odor of bait to exude to the atmosphere from said bait-receiving location.

4. The animal trap of claim 1, including at least first and second diverter members interposed in spaced relation in said pathway intermediate said entrance opening and at least said leading edge of said second electrode, said first and second diverter members together blocking visual access to said entrance opening by a target animal passing thereby to discourage the target animal from reversing direction, and said first and second diverter members together blocking simultaneous access to said electrodes by a straight element passing through said entrance opening.

5. The animal trap of claim 4, wherein said first diverter member is juxtaposed to said entrance opening and directs a target animal in a first-angled direction along said pathway, and said second diverter member redirects the target animal in a second direction angled to said first direction along said pathway.

6. The animal trap of claim 5 wherein each of said first and second diverter members include a free edge portion about which a target animal must pass, and said free edge portions of said first and second diverter members are on opposite sides of any straight line from said entrance opening to at least said second electrode.

7. The animal trap of claim 6, wherein said diverter members extend substantially the full height of said chamber between said floor of said housing and said cover when said cover is closed.

8. The animal trap of claim 6, wherein said pathway is defined by spaced walls of said housing, said first diverter member having a first end fixed to a first wall defining said pathway and a second end including said free edge portions spaced from a second wall defining said pathway and extending at a first angle from its first end to its second end, said second diverter member having a first end fixed to said second wall and a second end including said free edge portions spaced from said first wall and extending at a second angle from its first end to its second end, said second end of said first diverter member and said second end of said second diverter member each extending past a longitudinally extending midpoint of said pathway to block direct access from said entrance opening to at least said second electrode.

9. The animal trap of claim 8, wherein said first diverter member extends at approximately a 45° angle relative to said first wall and said second diverter member extends at approximately an opposite 45° angle to said second wall.

10. The animal trap of claim 1, wherein said barrier member is carried by said cover.

11. The animal trap of claim 10, wherein said cover is openable and said barrier member extends downwardly into said chamber when said cover is closed.

12. The animal trap of claim 1, wherein said first diverter member is an upwardly extending member spaced from said barrier member and being carried by said floor between said entrance opening and said barrier member, said first diverter member having an upper edge portion spaced from said floor a distance greater than said distance of said lower edge portion of said barrier member from said floor, whereby said first diverter member and said barrier together block access to said electrodes by a straight element passing through said entrance opening.

* * * * *